United States Patent
Acevedo Simon et al.

(10) Patent No.: US 12,452,964 B2
(45) Date of Patent: Oct. 21, 2025

(54) INDUCTION COOKING DEVICE

(71) Applicant: BSH Hausgeräte GmbH, Munich (DE)

(72) Inventors: Arturo Acevedo Simon, Saragossa (ES); Sandra Aranda Vazquez, Saragossa (ES); Nicolas Blasco Rueda, Saragossa (ES); Carlos Calvo Mestre, Saragossa (ES); Cristina Diez Esteban, Saragossa (ES); Jose Miguel Gil Narvion, Saragossa (ES); Diego Puyal Puente, Saragossa (ES); Francisco Villuendas Lopez, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 725 days.

(21) Appl. No.: 17/792,158

(22) PCT Filed: Jan. 13, 2021

(86) PCT No.: PCT/EP2021/050532
§ 371 (c)(1),
(2) Date: Jul. 12, 2022

(87) PCT Pub. No.: WO2021/151661
PCT Pub. Date: Aug. 5, 2021

(65) Prior Publication Data
US 2023/0049426 A1 Feb. 16, 2023

(30) Foreign Application Priority Data
Jan. 31, 2020 (EP) .................................. 20382057

(51) Int. Cl.
*H05B 6/06* (2006.01)

(52) U.S. Cl.
CPC ............. *H05B 6/062* (2013.01); *H05B 6/065* (2013.01)

(58) Field of Classification Search
None
See application file for complete search history.

(56) References Cited

U.S. PATENT DOCUMENTS 4,358,654 A * 11/1982 Estes ..................... H02M 7/539
219/625
6,528,770 B1 3/2003 Akel
(Continued)

FOREIGN PATENT DOCUMENTS

EP 2066013 A2 * 6/2009 ........ H02M 7/53871
EP 2506670 A2 * 10/2012 ............. H05B 6/065
(Continued)

OTHER PUBLICATIONS

JP_2007012490 Translation (Year: 2007).*
(Continued)

*Primary Examiner* — Woody A Lee, Jr.
(74) *Attorney, Agent, or Firm* — Michael E. Tschupp; Brandon G. Braun; Andre Pallapies

(57) ABSTRACT

An induction cooking appliance device includes an independent heating unit including an inductor, and a power supply unit configured to provide an alternating current for the first heating unit. The power supply unit includes a configuration unit configured to provide for a change of configuration of the power supply unit between a half-bridge topology and a full-bridge topology for supplying the first heating unit.

19 Claims, 6 Drawing Sheets

(56) References Cited

U.S. PATENT DOCUMENTS

| | | | | |
|---|---|---|---|---|
| 9,826,576 | B2 * | 11/2017 | Yoshino | .............. H05B 6/1209 |
| 2012/0061381 | A1 * | 3/2012 | Hashimoto | ............ H05B 6/062 |
| | | | | 219/620 |

FOREIGN PATENT DOCUMENTS

| | | | | | |
|---|---|---|---|---|---|
| EP | 2579680 | A1 | | 4/2013 | |
| EP | 2613608 | A1 | * | 7/2013 | ............. H05B 6/062 |
| JP | 2007012490 | A | * | 1/2007 | ............. H05B 6/062 |
| JP | 2007080751 | A | * | 3/2007 | ............. H05B 6/062 |
| JP | 4384085 | B2 | * | 12/2009 | ............. H05B 6/062 |
| KR | 20090005142 | U | * | 5/2009 | |
| WO | WO-2012035709 | A1 | * | 3/2012 | ............. H05B 6/062 |

OTHER PUBLICATIONS

WO_2012035709_Translation (Year: 2012).*
Https://web.archive.org/web/20150213004450/http://en.wikipedia.
org/wiki/Switched-mode_power_supply (Year: 2015).*
International Search Report PCT/EP2021/050532 dated Mar. 18, 2021.

* cited by examiner

INDUCTION COOKING DEVICE

CROSS-REFERENCES TO RELATED APPLICATIONS

This application is the U.S. National Stage of International Application No. PCT/EP2021/050532, filed Jan. 13, 2021, which designated the United States and has been published as International Publication No. WO 2021/151661 A1 and which claims the priority of European Patent Application, Serial No. 20382057.6, filed Jan. 31, 2020, pursuant to 35 U.S.C. 119(a)-(d).

The contents of International Application No. PCT/EP2021/050532 and European Patent Application, Serial No. 20382057.6 are incorporated herein by reference in their entireties as if fully set forth herein.

BACKGROUND OF THE INVENTION

The invention relates to an induction cooking appliance device and to a method for operating an induction cooking appliance device.

U.S. Pat. No. 6,528,770 B1 already discloses an induction hob having a first heating unit with a first inductor and an additional first inductor, a second heating unit with a second inductor and with a power supply unit with two inverters for supplying the heating units. In a half-bridge topology, the first heating unit with the first inductor and the second heating unit with the second inductor can be supplied in each case separately by way of one of the inverters in each case. To provide a higher heat output, the first heating unit with the first inductor and with the additional first inductor can be operated simultaneously in a full-bridge configuration by way of the two inverters, while the second heating unit cannot be operated simultaneously. The second heating unit cannot be operated in a full-bridge topology. The entire first heating unit with the first inductor and the additional first inductor cannot be operated in a half-bridge topology.

BRIEF SUMMARY OF THE INVENTION

The object of the invention consists in particular in, but is not restricted to, providing a generic device with improved properties in terms of flexibility and/or efficiency.

The invention is based on an induction cooking appliance device, in particular an induction hob device, having at least one independent heating unit, comprising at least one inductor, and having a power supply unit for providing an alternating current for the heating unit.

It is proposed that the power supply unit has a configuration unit, which is provided for a change of configuration of the power supply unit between a half-bridge topology and a full-bridge topology in order to supply the entire heating unit.

By means of an embodiment of this type, an induction cooking appliance device in particular can be provided with improved properties in respect of flexibility and/or efficiency. In particular, it is advantageously possible by means of the configuration unit to operate the entire heating unit both in a half-bridge topology, for providing low to medium heat outputs, and also in a full-bridge topology, for providing high to very high heat outputs. Moreover, further heating units can advantageously likewise be operated in a half-bridge topology or in a full-bridge topology. This supplies a high degree of flexibility for a user. Moreover, a particularly efficient operation of an induction cooking appliance at low to medium heat outputs can advantageously be achieved, while moreover operation is possible in a boost operating mode at high to very high heat outputs. Moreover, there is advantageously the option to change a resonance capacity of the power supply unit, as a result of which in different operating situations switching frequencies close to the resonance frequency can be reached and reactive power losses can thus be minimized. By deactivating individual resonance capacitors, an efficiency in a half-bridge topology can advantageously be further improved. By optionally connecting further resonance capacitors, an efficiency in a full-bridge topology can advantageously be increased. The induction cooking appliance device can advantageously be operated in ZVS mode in each case in both the full-bridge topology and also in the half-bridge topology, as a result of which in particular switching losses can advantageously be reduced and in particular an energy efficiency can be further improved. Furthermore, costs can advantageously be reduced and/or a particularly compact design achieved, by in each case two single-pole changeover switches of the configuration unit being replaceable with a two-pole changeover switch.

An "induction cooking appliance device", in particular an "induction hob device", is to be understood to mean in particular at least one part, in particular a subassembly, of an induction cooking appliance, in particular an induction hob. The induction cooking appliance could be embodied for example as an induction grill and/or as an induction oven and/or as a combination appliance with additional microwave functionality. The induction cooking appliance is preferably embodied as an induction hob. It is conceivable in particular that the induction hob is embodied as a matrix induction hob. In particular, the induction cooking appliance device, in particular the induction hob device, can also comprise the entire induction cooking appliance, in particular the entire induction hob.

A "heating unit" is to be understood to mean in particular a unit which can have in particular a number of inductors and which is provided to supply energy, in particular in the form of a magnetic alternating field, at least to one receiving element. To this end the heating unit has at least one inductor. The heating unit can have in particular precisely one inductor. Alternatively, it is conceivable for the heating unit to have a number of inductors, which can be arranged in particular in a matrix-like manner and/or in particular can be actuated separately and/or collectively. An "independent" heating unit is to be understood to mean in particular a heating unit, which can be operated independently of other heating units, in particular independently of one and/or more further heating unit(s). In particular, a heat output provided by the heating unit can be set independently of a heat output provided by other heating units. An "entire heating unit" is to be understood to mean in particular all inductors which are assigned to the heating unit.

Here an "inductor" is to be understood to mean in particular an element which has at least one induction coil and/or is embodied as an induction coil, and which, in at least one operating state, is provided to supply energy, in particular in the form of a magnetic alternating field, at least to a receiving element. The receiving element is embodied in particular as a part and/or a subassembly of a receiving unit and is provided in particular to receive the energy provided by the heating unit, in particular by the at least one inductor of the heating unit. The receiving unit can be in particular part of the induction cooking appliance device. Alternatively, it is conceivable for the receiving unit to be embodied as a unit which is independent of the induction cooking appliance device and/or as part of a further device which is independent of the induction cooking appliance device. The receiving unit can be provided in particular for setup on a region above the heating unit and/or a further heating unit. The receiving unit could be embodied for instance as an item of cookware and in particular have at least one secondary coil as a receiving element for receiving the energy provided by the inductor of the heating unit and/or a further inductor of the further heating unit. Alternatively or in addition, the receiving element could also be embodied as a metallic heating means, in particular as an at least partially ferromagnetic heating means, for instance as a ferromagnetic base of an item of cookware, in which, in an operating state, eddy currents and/or remagnetization effects are produced by the inductor and are converted into heat.

A "power supply unit" is to be understood to mean in particular a unit which, in at least one operating state, supplies an in particular high-frequency alternating current for the at least one heating unit, in particular for the inductor of the heating unit. The power supply unit comprises at least one inverter. The inverter comprises at least two inverter switching elements. An inverter switching element has at least one control contact, by way of which it can be controlled in particular by a control unit. In particular, the inverter switching element is embodied as a semiconductor switching element, in particular as a transistor, advantageously as a bipolar transistor with a preferably isolated gate electrode (IGBT). Alternatively, the inverter switching element can be embodied as a mechanical and/or electromechanical switching element, in particular as a relay. For instance, the switching element can be embodied as a FET, as a MOSFET, preferably as an RC-IGBT and particularly preferably as an HEMT transistor.

A "configuration unit" is to be understood to mean in particular a unit of the power supply unit, which has at least one configuration element with at least one electrical pole and at least two electrical contacts. In particular, a first configuration of the power supply unit can be achieved by way of the configuration element of the configuration unit by establishing a first electrically conducting connection via a first electrical contact of the two electrical contacts and a further configuration of the power supply unit can be achieved by establishing a further electrically conducting connection by way of a second electrical contact of the two electrical contacts. The configuration unit advantageously has a number of configuration elements which are embodied to be controlled in particular independently of one another. It is in particular also conceivable for at least two of the configuration elements to be embodied and collectively and simultaneously actuatable by means of a shared switch, for instance a two-pole changeover switch. The configuration unit can be embodied in particular at least partially in one piece with the power supply unit. "Embodied at least partially in one piece" is to be understood in this context to mean in particular that the configuration unit and the power supply unit are connected in an electrically conducting manner with one another in at least one operating state and in particular embody at least one shared power circuit.

A "half-bridge topology" is to be understood to mean in particular a topology of the power supply unit, in which the heating unit can be supplied with an alternating current by way of precisely one inverter from two inverter switching elements. In the half-bridge topology of the power supply unit, low to medium heat outputs are in particular provided by the heating unit. A "full-bridge topology" is to be understood to mean in particular a topology of the power supply unit, in which the heating unit can be supplied with an alternating current by way of precisely two inverters connected electrically in parallel with in each case two inverter switching elements. In the half-bridge topology of the power supply unit, high to very high heat outputs are in particular provided by the heating unit.

"Provided" is to be understood to mean in particular specifically programmed, configured and/or equipped. The fact that an object is intended for a particular function is to be understood to mean in particular that the object fulfills and/or carries out this particular function in at least one application and/or operating state.

It is also proposed that the induction cooking appliance device has an independent further heating unit, comprising at least one further inductor, which can be supplied by the power supply unit simultaneously with the heating unit. This makes it possible to further increase flexibility for a user in particular. In particular, advantageously both the heating unit and also the further heating unit can be operated in each case in a half-bridge topology and in each case in a full-bridge topology.

Moreover, it is proposed that the heating unit and the further heating unit can be operated simultaneously by the configuration unit in a half-bridge topology in each case. In particular, the entire heating unit and the entire further heating unit can be operated simultaneously by the configuration unit in each case in a half-bridge topology. This advantageously makes it possible to increase flexibility for a user. In particular, the heating unit and the further heating unit can moreover be operated simultaneously particularly efficiently.

Furthermore, it is proposed that the power supply unit has a supply subunit, which comprises at least one inverter and at least one resonance capacitor unit for supplying the heating unit, and a further supply subunit, which comprises at least one further inverter and at least one further resonance capacitor unit for supplying the further heating unit. A "supply subunit" is to be understood to mean in particular a subunit of the power supply unit, which provides at least one power circuit for independently supplying at least one heating unit. A "resonance capacitor unit" is to be understood to mean in particular a unit of the supply subunit, which has at least one resonance capacitor. In at least one operating state of the induction cooking appliance device, the at least one resonance capacitor of the resonance capacitor unit forms a resonant circuit with an inverter switching element of the inverter of the supply subunit and at least one inductor of at least one heating unit, which is supplied with an alternating current by means of the supply subunit.

Furthermore, it is proposed that the supply subunit and the further supply subunit are connected electrically in series by way of at least one switching element of the configuration unit. This advantageously enables a particularly simple change of configuration of the power supply unit. Furthermore, a user can advantageously be provided with particularly high user-friendliness.

Furthermore, it is proposed that the supply subunit and the further supply subunit are connected electrically cyclically in series by way of at least one further switching element of the configuration unit. "Cyclically" is to be understood in this context to mean in particular that the supply subunit and the further supply subunit can be connected in series alternately by way of the switching element and by way of the further switching element. As a result, a change of configuration can advantageously be further simplified. In particular, a rapid change of configuration from one configuration for supplying the heating unit in a full-bridge topology to a further configuration for supplying the further subunit in a full bridge configuration is in particular advantageously enabled.

Moreover, it is proposed that the supply subunit and the further supply subunit are designed to be identical to one another. As a result, a manufacturing process can advantageously be simplified. Moreover, production costs can advantageously be reduced, particularly due to economies of scale. In this way, a particularly cost-effective induction cooking appliance device can further advantageously be supplied with advantageous properties in respect of flexibility and/or efficiency.

Furthermore, it is proposed that the induction cooking appliance device has a control unit, which operates the power supply unit in a ZVS mode. A "ZVS" mode is to be understood to mean in particular an operating mode in which the control unit operates the power supply unit, in particular at least one inverter of the power supply unit, with at least one substantially voltage-free switching process, which is known by the term "zero voltage switching" (ZVS). An "at least substantially voltage-free switching process" is to be understood to mean in particular a switching process in which voltage, which is applied to and/or drops at an inverter switching element in particular during the switching process, is at least substantially negligible, in particular substantially zero. A "negligible value" is to be understood to mean in particular a value which is lower than a maximum operating value in particular at least by a factor 10, advantageously by a factor 50, preferably by a factor 100 and particularly preferably by a factor 500. The control unit preferably operates the power supply unit in the ZVS mode using a special control strategy, which is known under the term "Asymmetrical Voltage Cancellation (AVC) Control". In this way the control unit can advantageously be operated in the ZVS mode across a particularly broad frequency range, as a result of which switching losses can advantageously be minimized across a large heat output range. Alternatively it is conceivable for the control unit to operate the power supply unit in the ZVS mode using a further special control strategy, which is known under the term "Phase Shift (PS) Control". It would moreover be conceivable for the control unit to operate the power supply unit in a ZCS mode, using a suitable special control strategy. A "ZCS mode" is to be understood to mean in particular an operating mode, in which the control unit operates the power supply unit, in particular at least one inverter of the power supply unit, with at least one substantially power-free switching process, in other words a switching process in which in particular during the switching process a current flowing through the inverter switching element to be switched assumes a negligible value and which is known under the term "zero current switching (ZCS)".

Furthermore, it is proposed that the configuration unit has at least one two-pole changeover switch, which is provided to at least collaborate during the change of configuration and which has in particular the switching element. In particular, the two-pole changeover switch can have the switching element and the further switching element. In this way a number of components and/or costs can advantageously be reduced. Furthermore, a particularly space-saving and/or compact arrangement of components can advantageously be enabled. Alternatively, the switching element and/or the further switching element could each be embodied as a single-pole changeover switch. A "single-pole changeover switch" is to be understood to mean in particular an electrical switch, which is known under the term "Single Pole Double Throw (SPDT) and which has at least one pole and at least two terminals for establishing and/or disconnecting an electrically conducting connection and is in particular provided to open a first power circuit and simultaneously to close a second power circuit. A "two-pole changeover switch" is to be understood to mean in particular an electrical switch, which is known under the term "Double Pole Double Throw (DPDT)" and which, in particular, contrary to a single-pole changeover switch, has at least two poles with in each case at least two terminals. A two-pole changeover switch can be understood to mean in particular a switch, which has two single-pole changeover switches which can be connected simultaneously and collectively.

Moreover, it is proposed that the configuration unit is provided to change at least one resonance capacitance of the power supply unit. This advantageously makes it possible to further increase energy efficiency. In particular, the resonance capacitance can advantageously be adjusted to different operating situations, as a result of which reactive power losses can advantageously be reduced in each case in the respective operating situations of the power supply unit and preferably minimized. A "resonance capacitance" is to be understood to mean the capacitance of a capacitor and/or a number of capacitors, which in at least one operating state of the induction cooking appliance device with at least one changeover switching element and at least one inductor of the heating unit, form a resonant oscillating circuit. With a specific switching frequency of the inverter, what is known as the resonance frequency, a heat output provided by the inductor is at a maximum and no reactive power losses occur in particular. If a value of the resonance capacitance of the resonant circuit changes, a value of the resonance frequency of the oscillating circuit thus also changes. For a particularly efficient operation, a switching frequency close to the resonance frequency is therefore aspired to, which is currently enabled in different operating situations by a change in the resonance capacity by means of the configuration unit.

Furthermore, it is proposed that the power supply unit has at least one resonance capacitor element, which can be deactivated by means of the configuration unit in a half bridge configuration of the power supply unit. This advantageously makes it possible to further increase flexibility. In particular, the resonance capacitance of at least one resonant circuit in the half-bridge configuration of the power supply unit can advantageously be reduced, as a result of which in particular a relative distance between a switching frequency and a resonance frequency can be reduced and reactive power losses can thus be reduced. By means of a reduced number of resonance capacitor elements to be operated, further losses, due to parasitic effects such as ohmic transmission losses and/or dielectric pole reversal losses, can moreover advantageously be reduced by resonance capacitor elements. The induction cooking appliance device can therefore advantageously be operated in a particularly energy-efficient manner in operating modes, in which low to medium heat outputs are provided in the half-bridge configuration by the heating unit and/or the further heating unit, as a result of which a high added value can in particular also be achieved for a user, for instance by means of savings on energy costs.

Furthermore, it is proposed that the power supply unit has at least one resonance capacitor element, in particular a further resonance capacitor element, which is provided to change the resonance capacitance of the power supply unit in a full-bridge configuration. This advantageously makes it possible to increase efficiency. In particular, the resonance capacitance of the power supply unit in the full bridge configuration of the power supply unit can advantageously be adjusted to a specific operating situation.

Moreover, it is proposed that the resonance capacitor element is arranged such that it can be connected in parallel with an inverter of the power supply unit in order to increase the resonance capacitance. This advantageously makes it possible to increase efficiency. Moreover, energy efficiency can advantageously be increased. In particular, a relative distance between a resonance frequency and a switching frequency can advantageously be minimized in particular in operating modes of the induction cooking appliance device, in which high to very high heat outputs are provided in the full-bridge configuration by means of the heating unit, as a result of which reactive power losses are reduced.

Alternatively or in addition, it is proposed that the resonance capacitor element, in particular a further resonance capacitor element, is arranged such that it can be connected in series with an inverter of the power supply unit in order to reduce the resonance capacitance. This advantageously makes it possible to increase flexibility. Moreover, energy efficiency can advantageously be increased. In particular, a relative distance between a resonance frequency and a switching frequency can advantageously be minimized in particular in operating modes of the induction cooking appliance device, in which in a full-bridge configuration medium to high heat outputs are provided by means of the heating unit, as a result of which reactive power losses are reduced.

The invention is further based on a method for operating an induction cooking appliance device, having at least one independent heating unit, comprising at least one inductor, and having a power supply unit for providing an alternating current for the heating unit.

It is proposed that the power supply unit be configured to supply the entire heating unit between a half-bridge topology and a full-bridge topology. This advantageously supplies an in particular flexible and/or efficient method for operating the induction cooking appliance device.

The induction cooking appliance device is not to be restricted here to the afore-described application and embodiment. In particular, the induction cooking appliance device for fulfilling a mode of operation described herein can have number which deviates from a number of individual elements, components and units cited herein.

Further advantages result from the following description of the drawing. The drawing shows exemplary embodiments of the invention. The drawing, the description and the claims contain numerous features in combination. The person skilled in the art will expediently also consider the features individually and combine them to form useful further combinations.

DETAILED DESCRIPTION OF EXEMPLARY EMBODIMENTS OF THE PRESENT INVENTION

Figure 1:
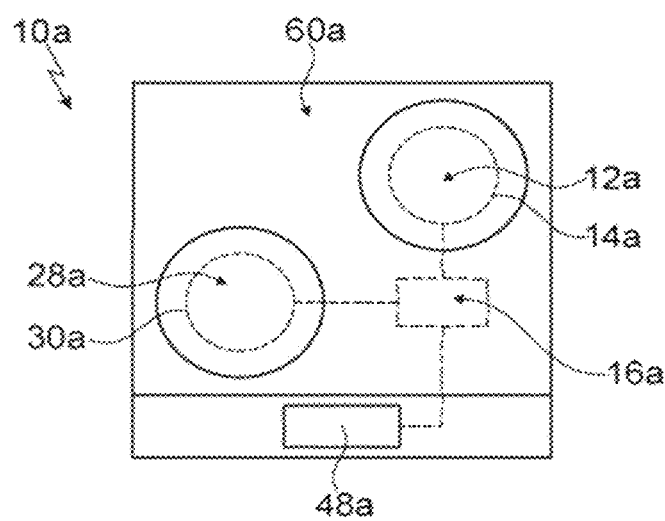
FIG. 1 shows an induction cooking appliance with an induction cooking appliance device, comprising a heating unit, a further heating unit and a power supply unit in a schematic view.

FIG. 1 shows an induction cooking appliance 60a with an induction cooking appliance device 10a. The induction cooking appliance 60a is embodied as an induction hob. The induction cooking appliance device 10a has an independent heating unit 12a. The heating unit 12a comprises an inductor 14a. The induction cooking appliance device 10a has a power supply unit 16a. The power supply unit 16a is provided to supply an alternating current for the heating unit 12a. The power supply unit 12a has a configuration unit 18a (cf. FIG. 2). There is provision for the configuration unit 18a to provide a change of configuration of the power supply unit 16a between a half-bridge topology and a full-bridge topology for supplying the overall heating unit 12a.

The induction cooking appliance device 10a has an independent further heating unit 28a. The further heating unit 28a comprises a further inductor 30a. The further inductor 30a of the further heating unit 12a can be supplied with an alternating current by means of the power supply unit 16a. The further heating unit 28a can be supplied by the power supply unit 16a simultaneously with the heating unit 12a.

The induction cooking appliance device 10a has a control unit 48a. The control unit 48a is provided to actuate the power supply unit 16a. The control unit operates the power supply unit 16a in a ZVS mode (cf. FIG. 4).

Figure 2:
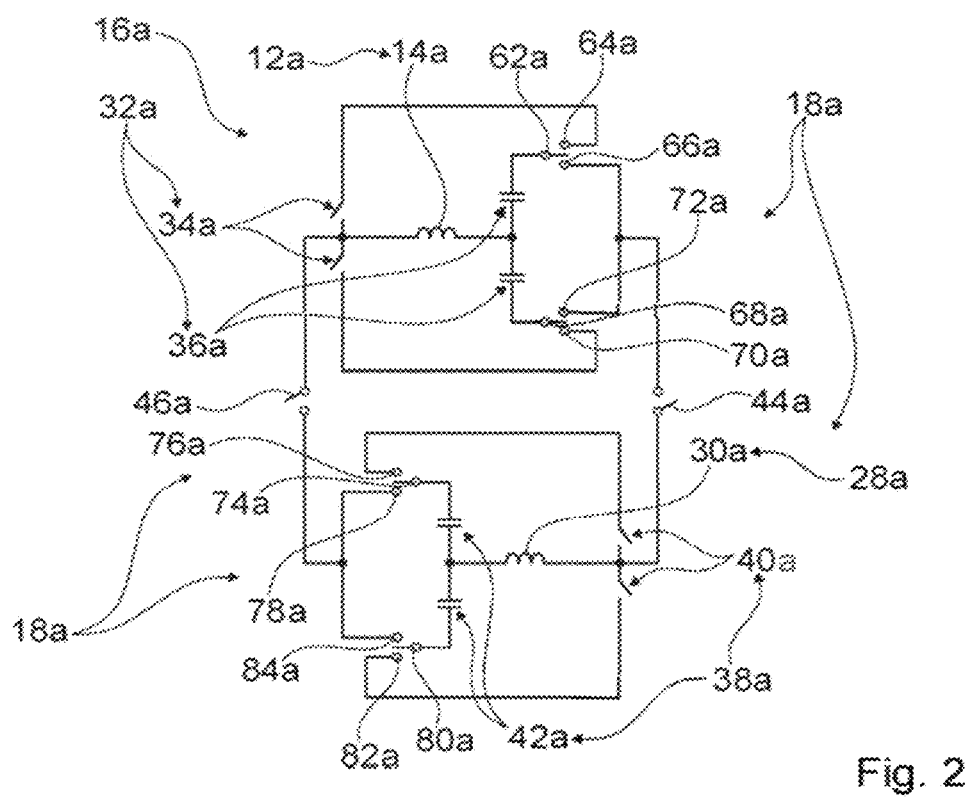
FIG. 2 shows the power supply unit with a configuration unit in a schematic electric circuit diagram.

The heating unit 12a and the further heating unit 28a can be operated in each case simultaneously in a half-bridge topology by the configuration unit 18a (cf. FIG. 2).

FIG. 2 shows an electrical circuit diagram of the power supply unit 16a with the configuration unit 18a. The configuration unit 18a has a first configuration element 62a with two contacts 64a, 66a and a second configuration element 68a with two contacts 70a, 72a. The power supply unit 16a has a supply subunit 32a for supplying the heating unit 12a. The supply subunit 32a has an inverter 34a and a resonance capacitor unit 36a. For a configuration of the power supply unit 16a in order to supply the heating unit 12a in a half-bridge topology, the configuration unit 18a establishes a first electrically conducting connection between the inductor 14a of the heating unit 12a and the inverter 34a by means of the first configuration element 62a by way of the contact 64a. The configuration unit 18a establishes a second electrically conducting connection between the inductor 14a of the heating element 12a and the inverter 34a by means of the second configuration element 68a by way of the contact 70a.

The configuration unit 18a has a further first configuration element 74a with two contacts 76a, 78a and a further second configuration element 80a with two contacts 82a, 84a. The power supply unit 16a has a further supply subunit 38a for supplying the further heating unit 28a. The further supply subunit 38a has a further inverter 40a and a further resonance capacitor unit 42a. For a configuration of the power supply unit 16a in order to supply the heating unit 28a in a half-bridge topology, the configuration unit 18a establishes a first electrically conducting connection between the further inductor 30a of the further heating unit 28a and the further inverter 40a by means of the further first configuration element 74a by way of the contact 76a. The configuration unit 18a establishes a second electrically conducting connection between the inductor 30a of the further heating element 28a and the further inverter 40a by means of the further second configuration element 80a by way of the contact 82a.

The supply subunit 32a and the further supply subunit 38a are embodied identical to one another.

The configuration unit 18a has a switching element 44a. In an opened state of the switching element, the heating unit 12a and the further heating unit 28a can be operated by the configuration unit 18a simultaneously in a half-bridge topology in each case.

In a closed state of the switching element 44a, the supply subunit 32a and the further supply subunit 38a are connected electrically in series.

In the closed state of the switching element 44a, it is made possible to supply power to the entire heating unit 12a by means of the power supply unit 16a in a full-bridge topology by a change of configuration by means of the configuration unit 18a. For the change of configuration, the configuration unit 18a first disconnects the electrically conducting connection, by means of the first configuration element 62a, by way of the contact 64a and establishes a new electrically conducting connection by way of the contact 66a.

The configuration unit 18a disconnects the electrically conducting connection by means of the second configuration element 68a by way of the contact 70a and establishes a new electrically conducting connection by way of the contact 72a. The configuration unit 18a disconnects the electrically conducting connection for the change of configuration by means of the further first configuration element 74a by way of the contact 76a and establishes a new electrically conducting connection by way of the contact 78a. The configuration unit 18a disconnects the electrically conducting connection by means of the further second configuration element 80a by way of the contact 82a and establishes a new electrically conducting connection by way of the contact 84a. In the full-bridge topology, the power supply unit 16a supplies the inductor 14a of the heating unit 12a with an alternating voltage by way of the inverter 34a and by way of the further inverter 40a in each case.

The configuration unit 18a has a further switching element 46a. In an opened state of the further switching element 46a, the heating unit 12a and the further heating unit 28a can be operated by the configuration unit 18a simultaneously in a half-bridge topology in each case.

In a closed state of the further switching element 46a, the supply subunit 32a and the further supply subunit 38a are connected electrically cyclically in series.

By closing the further switching element 46a, it is made possible to supply power to the entire further heating unit 12a in a full-bridge topology by means of a further change of configuration by means of the configuration unit 18a.

Figure 3:
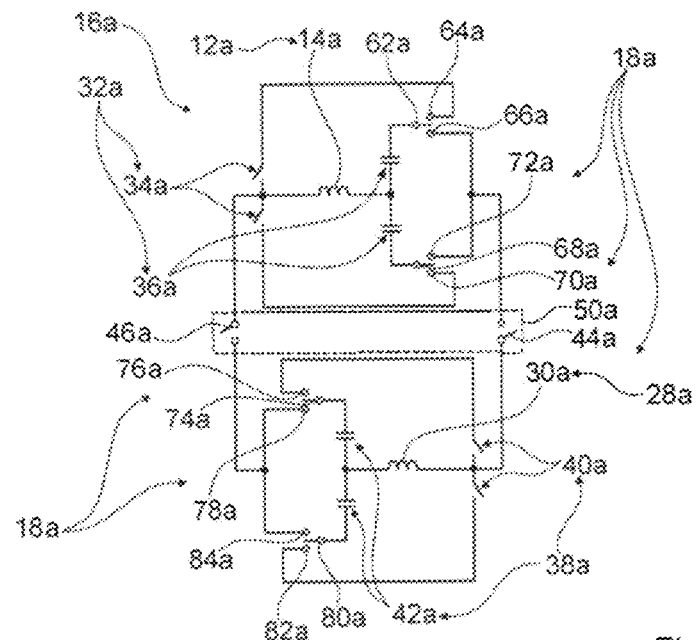
FIG. 3 shows the power supply unit with the configuration unit in a further schematic electric circuit diagram.

FIG. 3 shows the power supply unit 16a with the configuration unit 18a. The configuration unit 18a has a two-pole changeover switch 50a. The two-pole changeover switch 50a comprises the switching element 44a and the further switching element 46a. The two-pole changeover switch 50a is provided to collaborate during a change of configuration.

Figure 4:
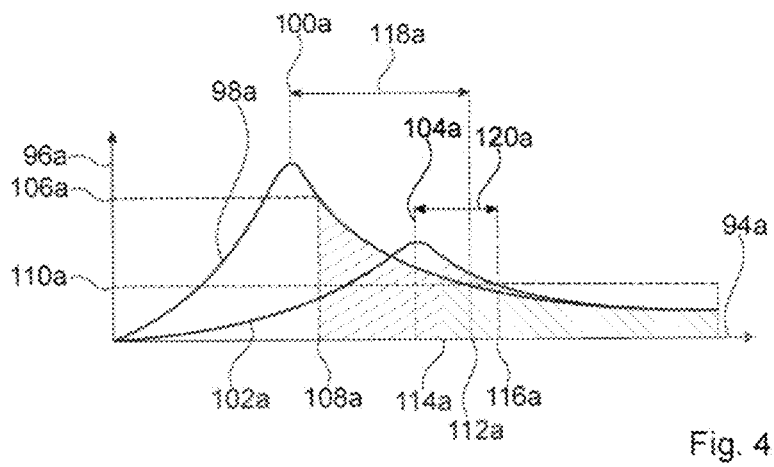
FIG. 4 shows a diagram for displaying an effect of a change in a resonance capacitance of the power supply unit.

FIG. 4 shows a diagram for displaying an effect of a change in a resonance capacitance. A switching frequency, at which the control unit 48a operates the power supply unit 16a, is plotted on an x-axis 94a of the diagram. A heat output is plotted on a y-axis 96a. A first heat output curve 98a shows a course of a first heat output in a first operating mode of the induction cooking appliance device 10a with a first resonance capacitance. The first heat output curve 98a has a maximum with a first resonance frequency 100a. To achieve a maximum heat output 106a in the ZVS mode of the control unit, a first minimum switching frequency 108a is required. In order to reduce the heat output to a target heat output 110a, an increase in the switching frequency to a first target heat output switching frequency 112a is required. A second heat output curve 102a shows a course of a second heat output in a second operating mode of the induction cooking appliance device 10a with a lower second resonance capacitance. The second heat output curve 102a has a maximum with a higher second resonance frequency 104a. For operation in a ZVS mode, a second minimum switching frequency 114a is required. To achieve the target heat output 110a, a second target heat output switching frequency 116a is required. A first relative distance 118a between the first target heat output frequency 112a and the first resonance frequency 100a in the first operating move is greater than a second relative distance 120 between the second target heat output frequency 116a and the second resonance frequency 104a. In the second operating mode, a more efficient operation of the induction cooking appliance device 10a is made possible compared with the first operating mode.

The configuration unit 18a is provided to change at least one resonance capacitance of the power supply unit 16a.

Figure 5:
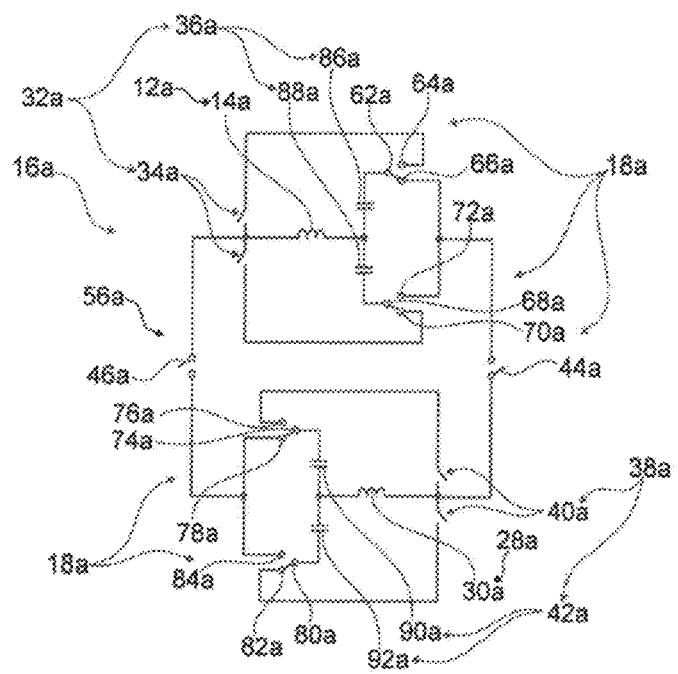
FIG. 5 shows a further schematic electric circuit diagram of the power supply unit in a configuration with a changed resonance capacitance.

FIG. 5 shows the power supply unit 16a with the configuration unit 18a in a half-bridge configuration 56a with an opened switching element 44a and opened further switching element 46a. In the half-bridge configuration 56a, the heating unit 12a and the further heating unit 28a can be operated in each case simultaneously and independently of one another. The resonance capacitor unit 36a of the supply subunit 32a of the power supply unit 16a has a first resonance capacitor element 86a and a second resonance capacitor element 88a. In the half-bridge configuration 56a, the first resonance capacitor element 86a or the second resonance capacitor element 88a can be deactivated by the configuration unit. FIG. 5 shows the first resonance capacitor element 86a disconnected. To reduce the resonance capacitance, the configuration unit disconnects the electrically conducting connection of the resonance capacitor element 86a by means of the first configuration element 62a by way of the contact 64a.

The further resonance capacitor unit 42a of the further supply subunit 38a of the power supply unit 16a has a further first resonance capacitor element 90a and a further second resonance capacitor element 92a. In the half-bridge configuration 56a, the further first resonance capacitor element 90a or the further second resonance capacitor element 92a can be deactivated by the configuration unit. FIG. 5 shows the further first resonance capacitor element 90a disconnected. To reduce the resonance capacitance, the configuration unit disconnects the electrically conducting connection of the further first resonance capacitor element 90a by means of the further first configuration element 74a by way of the contact 76a.

Figure 6:
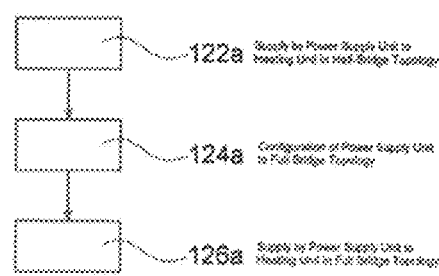
FIG. 6 shows a schematic diagram of a method for operating the induction cooking appliance device.

FIG. 6 shows a schematic view of a method for operating the induction cooking appliance device 10a. The method comprises a first method step 122a, a second method step 124a and a third method step 126a. In the first method step 122a, the power supply unit 16a supplies the entire heating unit 12a by way of the supply subunit 32a in a half-bridge topology. In the second method step 124a, the configuration unit 18a configures the power supply unit 16a from the half-bridge topology into a full bridge topology. In the third method step 126a, the power supply unit 16a supplies the entire heating unit 12a by way of the supply subunit 32 and by way of the further supply subunit 38a in the full-bridge topology.

Figure 7:
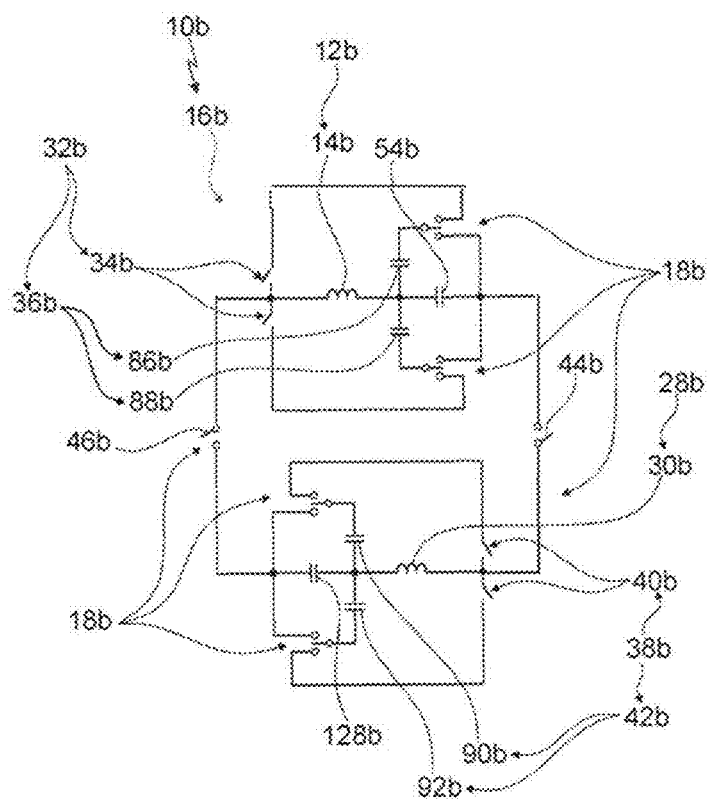
FIG. 7 shows a further exemplary embodiment of an induction cooking appliance device with a power supply unit having a resonance capacitor element, which can be connected in parallel, in a schematic electric circuit diagram.
Figure 8:
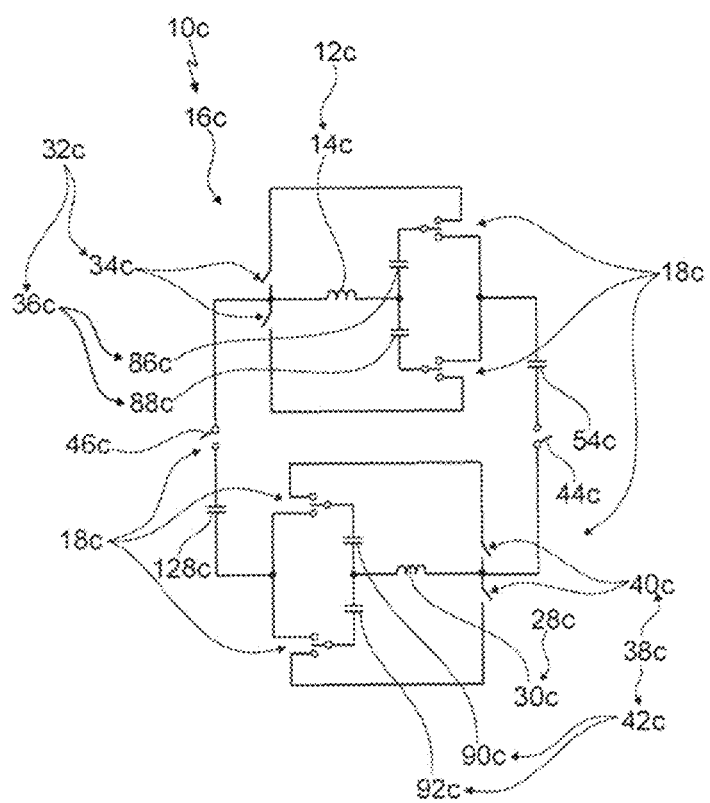
FIG. 8 shows a further exemplary embodiment of an induction cooking appliance device with a power supply unit having a resonance capacitor element, which can be connected in series, in a schematic electric circuit diagram
Figure 9:
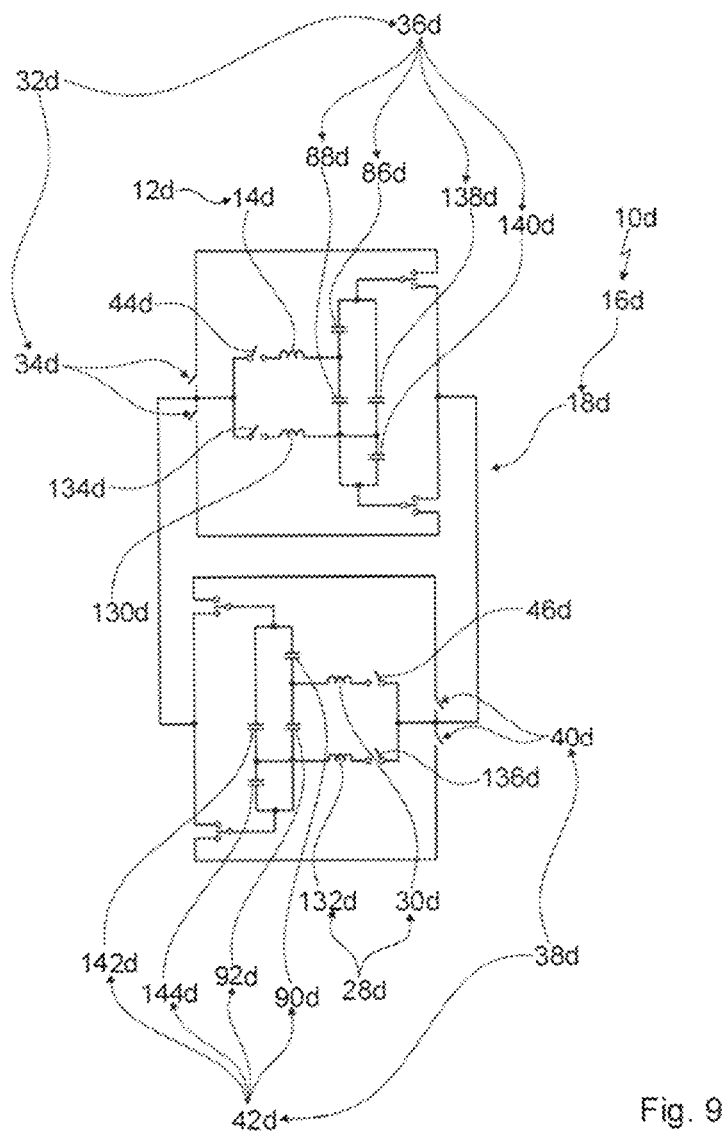
FIG. 9 shows a further exemplary embodiment of an induction cooking appliance device with a heating unit and a further heating unit, in each case comprising two inductors, and with a power supply unit in a schematic electric circuit diagram.

Shown in FIGS. 7 to 9 are three further exemplary embodiments of the invention. The following descriptions are substantially restricted to the differences between the exemplary embodiments, wherein with regard to components, features and functions which remain the same, reference can be made to the description of the exemplary embodiment in FIGS. 1 to 6. In order to differentiate between the exemplary embodiments, the letter a in the reference characters of the exemplary embodiment is replaced in the FIGS. 1 to 6 by the letter b in the reference characters of the exemplary embodiment in FIG. 7, by the letter c in the reference characters of the exemplary embodiment in FIG. 8 and by the letter d in the reference characters of the exemplary embodiment in FIG. 9. Reference can basically also be made to the drawings and/or the description of the exemplary embodiment in FIGS. 1 to 6, in respect of components labeled the same, in particular in respect of components with identical reference characters.

FIG. 7 shows a further exemplary embodiment of an induction cooking appliance device 10b with a power supply unit 16b. The induction cooking appliance device 10b differs from the induction cooking appliance device 10a in that a power supply unit 16b has further elements compared with the power supply unit 16a. FIG. 7 shows an electrical circuit diagram of the power supply unit 16b of the induction cooking appliance device 10b. The power supply unit 16b has a resonance capacitor element 54b. The resonance capacitor element 54b is provided to change the resonance capacitance in a full bridge configuration of the power supply unit 16b in order to supply a heating unit 12b. In order to increase the resonance capacitance, the resonance capacitor element 54b is arranged such that it can be connected in parallel with an inverter 34b of the power supply unit 16b. The power supply unit 16b has a further resonance capacitor element 128b. The further resonance capacitor element 54b is provided to change the resonance capacitance in a full bridge configuration of the power supply unit 16b in order to supply a further heating unit 28b. In order to increase the resonance capacitance, the resonance capacitor element 128b is arranged such that it can be connected in parallel with a further inverter 34b of the power supply unit.

FIG. 8 shows a further exemplary embodiment of an induction cooking appliance device 10c. The induction cooking appliance device 10c differs from the induction cooking appliance device 10b only in respect of an arrangement of resonance capacitor elements which differs compared with the power supply unit 16b. The power supply unit 16c has a resonance capacitor element 54c. The resonance capacitor element 54c is provided to change the resonance capacitance in a full bridge configuration of the power supply unit 16c in order to supply a heating unit 12c. In order to reduce the resonance capacitance, the resonance capacitor element 54c is arranged such that it can be connected in series with an inverter 34c of the power supply unit 16c. The power supply unit 16c has a further resonance capacitor element 128c. The resonance capacitor element 128c is provided to change the resonance capacitance in a full bridge configuration of the power supply unit 16c in order to supply a further heating unit 28c. In order to reduce the resonance capacitance, the resonance capacitor element 128c is arranged such that it can be connected in series with a further inverter 40c of the power supply unit 16c.

FIG. 9 shows a further exemplary embodiment of an induction cooking appliance device 10d with a power supply unit 16d. The induction cooking appliance device 10d differs from the induction cooking appliance device 10a in respect of a heating unit 12d and in respect of a further heating unit 28d. The heating unit 12d has two inductors 14d, 130d. The power supply unit 16d has a supply subunit 32d for supplying the heating unit 12d. The supply subunit 32d comprises an inverter 34d and a resonance capacitor unit 36d. The resonance capacitor unit 36d comprises a first resonance capacitor element 86d and a second resonance capacitor element 88d, which form a first oscillating circuit with the inductor 14d and the inverter 34d. The resonance capacitor unit 36d comprises a third resonance capacitor element 138d and a fourth resonance capacitor element 140d, which form a second oscillating circuit with the inductor 130d. The power supply unit 16d has a configuration unit 18d, which is provided for a change of configuration of the power supply unit 16d between a half-bridge topology and a full-bridge topology for supplying the entire heating unit 12d or supplying one of the inductors 14d, 130d. The configuration unit 18d has two switching elements 44d, 130d. The inductor 14d of the heating unit 12d can be connected and/or deactivated by means of the switching element 44d. The inductor 130d can be connected and/or deactivated by means of the switching element 44d. The further heating unit 28d has two further inductors 30d, 132d. The power supply unit 16d has a further supply subunit 38d for supplying the further heating unit 28d. The supply subunit 38d comprises a further inverter 40d and a further resonance capacitor unit 42d. The further resonance capacitor unit 42d comprises a further first resonance capacitor element 90d and a further second resonance capacitor element 92d, which form a further first oscillating circuit with the further inductor 30d and the further inverter 40d. The further resonance capacitor unit 42d comprises a further third resonance capacitor element 142d and a further fourth resonance capacitor element 144d, which form a further second oscillating circuit with the inductor 132d. The configuration unit 18d is provided for a change of configuration of the power supply unit 13d between a half-bridge topology and a full-bridge topology for supplying the entire heating unit 28d or supplying one of the further inductors 30d 132d of the further heating unit 28d. The configuration unit has two further switching elements 46d, 136d. The further inductor 30d can be connected and/or deactivated by means of the further switching element 46d. The further inductor 132d can be connected and/or deactivated by means of the further switching element 46d.

The invention claimed is:

1. An induction cooking appliance device, comprising:
an independent first heating unit comprising an inductor;
an independent second heating unit comprising an inductor;

a power supply unit configured to provide an alternating current for the first heating unit, said power supply unit comprising a configuration unit configured to provide for a change of configuration of the power supply unit between a half-bridge topology and a full-bridge topology for supplying the first heating unit, said power supply unit being configured to supply the second heating unit simultaneously with the first heating unit,
wherein the power supply unit comprises a first supply subunit which comprises an inverter and a resonance capacitor unit for supplying the first heating unit, and a second supply subunit which comprises an inverter and a resonance capacitor unit for supplying the second heating unit; and
wherein the configuration unit comprises a switching element which is configured to connect the first and second supply subunits electrically in series.

2. The induction cooking appliance device of claim 1, constructed in the form of a hob device.

3. The induction cooking appliance device of claim 1, further comprising a control unit configured to operate the power supply unit in a ZVS mode.

4. The induction cooking appliance device of claim 1, wherein the configuration unit comprises a two-pole changeover switch which is configured to collaborate during the configuration change.

5. The induction cooking appliance device of claim 1, wherein the configuration unit is configured to change a resonance capacitance of the power supply unit.

6. The induction cooking appliance device of claim 5, wherein the power supply unit comprises a resonance capacitor element which is capable of being deactivated by the configuration unit in a half-bridge configuration of the power supply unit.

7. The induction cooking appliance device of claim 5, wherein the power supply unit comprises a resonance capacitor element configured to change the resonance capacitance of the power supply unit in a full-bridge configuration.

8. The induction cooking appliance device of claim 7, wherein the resonance capacitor element is arranged for connection in parallel with an inverter of the power supply unit in order to increase the resonance capacitance.

9. The induction cooking appliance device of claim 7, wherein the resonance capacitor element is arranged for connection in series with an inverter of the power supply unit in order to reduce the resonance capacitance.

10. The induction cooking appliance device of claim 1, wherein the configuration unit is configured to operate each of the first and second heating units simultaneously in a half-bridge topology.

11. The induction cooking appliance device of claim 1, wherein the configuration unit comprises a switching element which is configured to connect the first and second supply subunits electrically cyclically in series.

12. The induction cooking appliance device of claim 1, wherein the first and second supply subunits are designed to be identical to one another.

13. The induction cooking appliance device of claim 1, wherein the configuration unit comprises a two-pole changeover switch which is configured to collaborate during the configuration change and which comprises the switching element.

14. An induction cooking appliance, comprising an induction cooking appliance device, said induction cooking appliance device comprising an independent first heating unit comprising an inductor, an independent second heating unit comprising an inductor and a power supply unit configured to provide an alternating current simultaneously for the first heating unit and for the second heating unit, said power supply unit comprising a configuration unit configured to provide for a change of configuration of the power supply unit between a half-bridge topology and a full-bridge topology for supplying the first heating unit,
wherein the power supply unit comprises a first supply subunit which comprises an inverter and a resonance capacitor unit for supplying the first heating unit, and a second supply subunit which comprises an inverter and a resonance capacitor unit for supplying the second heating unit; and
wherein the configuration unit comprises a switching element which is configured to connect the first and second supply subunits electrically in series.

15. The induction cooking appliance of claim 14, constructed in the form of an induction hob.

16. The induction cooking appliance device of claim 14, further comprising a control unit configured to operate the power supply unit in a ZVS mode.

17. The induction cooking appliance device of claim 14, wherein the configuration unit comprises a two-pole changeover switch which is configured to collaborate during the configuration change.

18. The induction cooking appliance device of claim 14, wherein the configuration unit is configured to change a resonance capacitance of the power supply unit.

19. A method for operating an induction cooking appliance device, said method comprising configuring a power supply unit to supply an alternating current simultaneously to a first independent heating unit and a second independent heating unit of the induction cooking appliance device between a half-bridge topology and a full-bridge topology, wherein the power supply unit comprises a first supply subunit which comprises an inverter and a resonance capacitor unit for supplying the first heating unit, and a second supply subunit which comprises an inverter and a resonance capacitor unit for supplying the second heating unit and the configuration unit comprises a switching element which is configured to connect the first and second supply subunits electrically in series.

* * * * *